United States Patent
Yamanoi et al.

(10) Patent No.: US 9,779,315 B2
(45) Date of Patent: Oct. 3, 2017

(54) TRAFFIC SIGNAL RECOGNITION APPARATUS AND TRAFFIC SIGNAL RECOGNITION METHOD

(71) Applicant: Nissan Motor Co., Ltd., Yokohama-Shi, Kanagawa (JP)

(72) Inventors: Daiki Yamanoi, Kanagawa (JP); Toshiyuki Andou, Kanagawa (JP); Hidekazu Nishiuchi, Kanagawa (JP); Haruo Matsuo, Kanagawa (JP); Hiroshi Satoh, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/311,884

(22) PCT Filed: May 20, 2014

(86) PCT No.: PCT/JP2014/063347
§ 371 (c)(1),
(2) Date: Nov. 17, 2016

(87) PCT Pub. No.: WO2017/177864
PCT Pub. Date: Nov. 26, 2015

(65) Prior Publication Data
US 2017/0103275 A1    Apr. 13, 2017

(51) Int. Cl.
*G06K 9/00* (2006.01)
*G08G 1/095* (2006.01)
*G06T 7/70* (2017.01)

(52) U.S. Cl.
CPC ..... *G06K 9/00825* (2013.01); *G06K 9/00798* (2013.01); *G06T 7/70* (2017.01); *G08G 1/095* (2013.01)

(58) Field of Classification Search
CPC .................................................. G06K 9/00825
See application file for complete search history.

(56) References Cited

U.S. PATENT DOCUMENTS

2010/0033571 A1    2/2010    Fujita et al.

FOREIGN PATENT DOCUMENTS

| JP | 2007178223 A | 7/2007 |
| JP | 2007257299 A | 10/2007 |

(Continued)

OTHER PUBLICATIONS

Lindner, F. et al., Robust Recognition of Traffic Signals, IEEE Intelligent Vehicles Symposium, 2004, pp. 49-53, Parma, Italy.

*Primary Examiner* — Christopher S Kelley
*Assistant Examiner* — Jonathan Messmore
(74) *Attorney, Agent, or Firm* — Young Basile Hanlon & MacFarlane, P.C.

(57) ABSTRACT

A traffic signal recognition apparatus acquires image data by imaging the surroundings of a vehicle, detects a self-position of the vehicle, and detects, in the image, a traffic signal around the vehicle. The traffic signal recognition apparatus identifies two or more of the traffic signal predicted to be captured in the image, based on information on the self-position and map information containing positional information on the traffic signals, and assigns a priority level to each of the two or more traffic signals thus identified, based on a possibility of the traffic signal being blocked out of sight. When the two or more traffic signals are identified, the traffic signal detected in the image is a traffic signal with a highest priority level among the two or more traffic signals.

9 Claims, 8 Drawing Sheets

(56) References Cited

FOREIGN PATENT DOCUMENTS

| | | | |
|---|---|---|---|
| JP | 2007320458 | A | 12/2007 |
| JP | 2008149786 | A | 7/2008 |
| JP | 2008293277 | A | 12/2008 |
| JP | 2013171489 | A | 9/2013 |
| WO | 2008038370 | A1 | 4/2008 |

# TRAFFIC SIGNAL RECOGNITION APPARATUS AND TRAFFIC SIGNAL RECOGNITION METHOD

TECHNICAL FIELD

The present invention relates to a traffic signal recognition apparatus and a traffic signal recognition method.

BACKGROUND

A conventionally known vehicle surroundings recognition apparatus recognizes a traffic signal or a stop sign in an image acquired by imaging a scene ahead of the vehicle in its travelling direction (Japanese Patent Application Publication No. 2007-257299). When there are multiple traffic signals or stop signs in the image, Japanese Patent Application Publication No. 2007-257299 determines the order in which the traffic signals or stop signs are arranged in the travelling direction of the vehicle, and controls the travelling conditions of the vehicle according to a traffic signal or a stop sign that is located closest to the vehicle.

When selecting, from multiple traffic signals, a traffic signal based on which driving control is to be performed, Japanese Patent Application Publication No. 2007-257299 considers the distance from the vehicle to the traffic signal, but fails to consider the possibility of the traffic signal being blocked out of sight. A traffic signal is, in some cases, hidden and invisible from the vehicle due to a factor unknowable from map information, such as a preceding vehicle, a street tree, or road work.

SUMMARY

The present invention has been made in consideration of the above problem, and has an objective to provide a traffic signal recognition apparatus and a traffic signal recognition method that can improve a probability for detection of a traffic signal when two or more traffic signals are predicted to be captured in an image.

A traffic signal recognition apparatus according to an aspect of the present invention acquires an image by imaging surroundings of a vehicle, detects a self-position of the vehicle, and detects, in the image, a traffic signal around the vehicle. The traffic signal recognition apparatus identifies two or more of the traffic signal predicted to be captured in the image, based on the self-position and map information containing positional information on the traffic signals, and assigns a priority level to each of the two or more traffic signals thus identified, based on a possibility of the traffic signal being blocked out of sight. When the two or more traffic signals are identified, the traffic signal to be detected in the image is a traffic signal with a highest priority level among the two or more traffic signals.

DETAILED DESCRIPTION OF THE EMBODIMENTS

Figure 1:
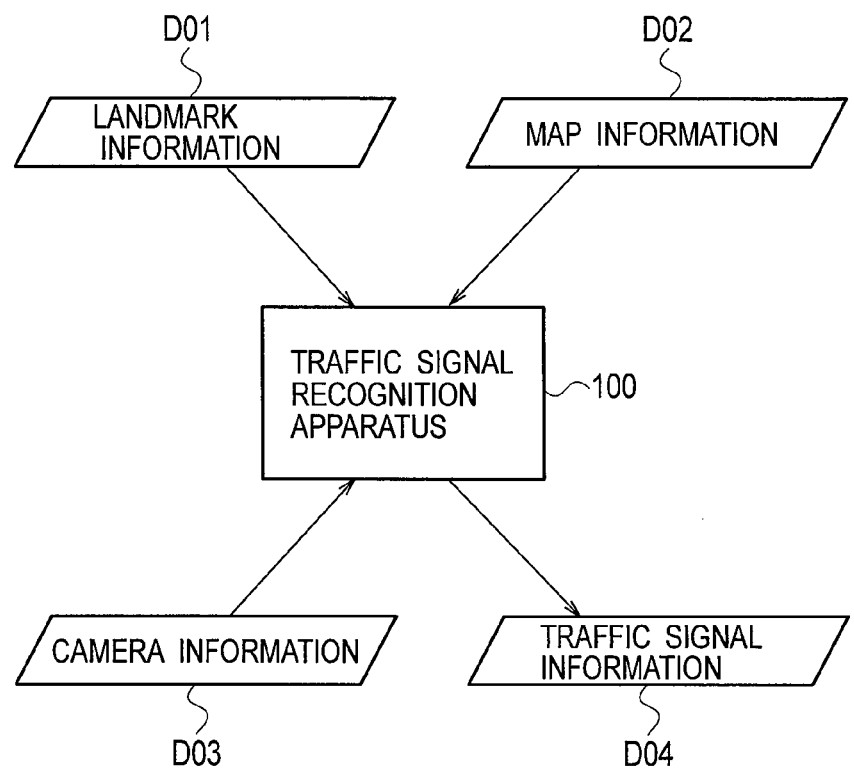
FIG. 1 is a block diagram showing information inputted to and outputted from a traffic signal recognition apparatus 100 according to an embodiment.

Hereinbelow, embodiments of the present invention are described based on the drawings. The same components are denoted by the same reference numerals to avoid repetitive description.

[First Embodiment]

With reference to FIG. 1, a description is given of information inputted to and outputted from a traffic signal recognition apparatus 100 according to an embodiment. The traffic signal recognition apparatus 100 recognizes a traffic signal, which is placed near a road on which a vehicle is travelling, in an image captured by an imager (camera) mounted in the vehicle.

The traffic signal recognition apparatus 100 receives input of map information D02, landmark information D01, and camera information D03. The map information D02 contains positional information on traffic signals, in which positions in an actual environment and positions on a map are associated with each other beforehand. The landmark information D01 is used to calculate the self-position of the vehicle in the actual environment. Landmarks include a characteristic object on the ground (terrestrial landmarks) and a Global Positioning System (GPS) satellite that transmits GPS signals receivable by the vehicle. In the embodiment, a terrestrial landmark is used as an example. The landmark information D01 contains, for example, positional information on terrestrial landmarks. The camera information D03 is used to obtain an image of the surroundings (e.g., the front) of the vehicle from the imager. Based on these pieces of information D01 to D03, the traffic signal recognition apparatus 100 outputs a result of recognition of a traffic signal as traffic signal information D04.

Figure 2:
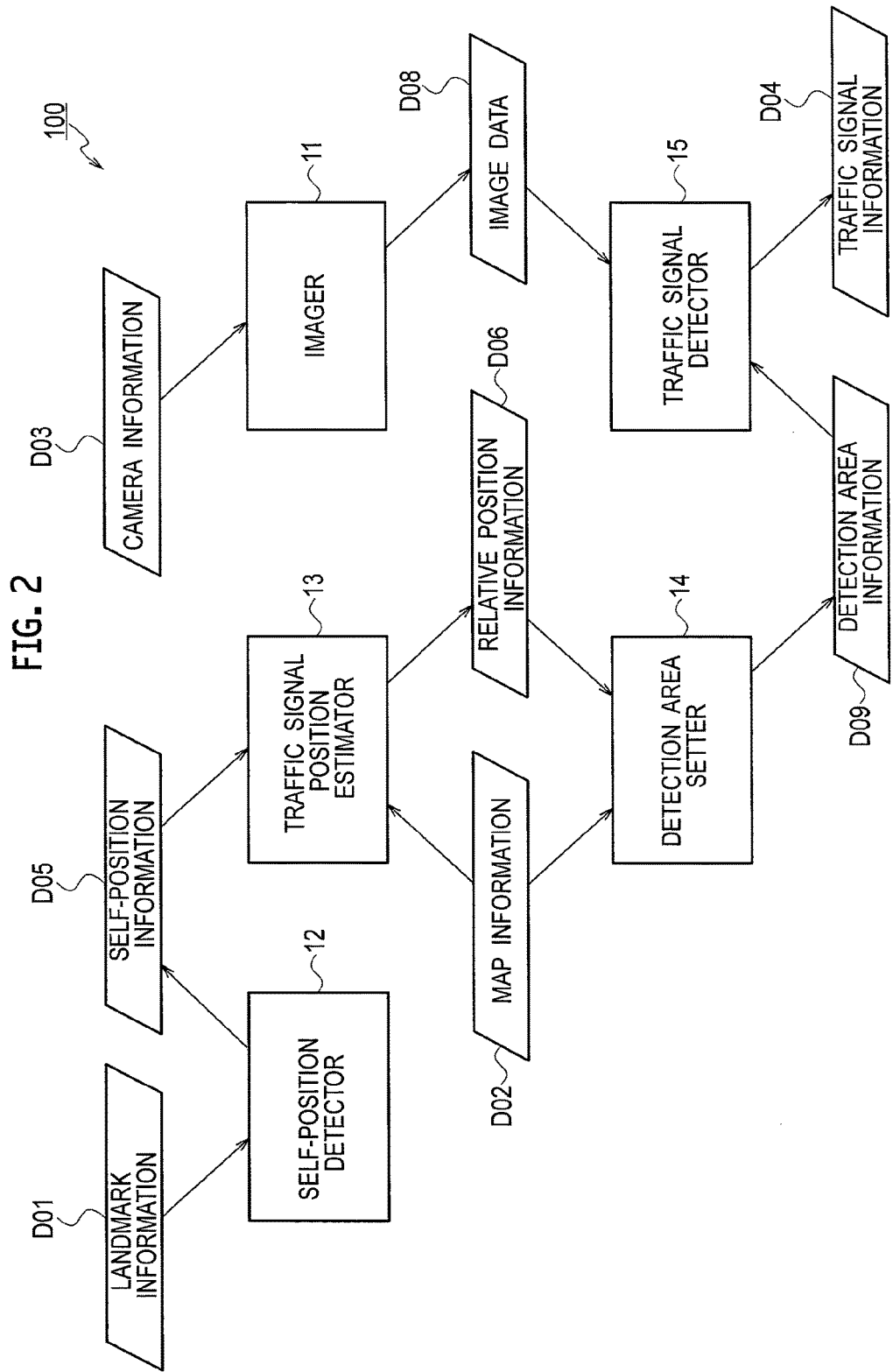
FIG. 2 is a block diagram showing the configuration of the traffic signal recognition apparatus 100 according to a first embodiment and a dataflow therein.

With reference to FIG. 2, the configuration of the traffic signal recognition apparatus 100 according to a first embodiment and a dataflow therein are described. The traffic signal recognition apparatus 100 includes an imager 11, a self-position detector 12, a traffic signal position estimator 13, a detection area setter 14, and a traffic signal detector 15.

The imager 11 is mounted in a vehicle and acquires an image by imaging the surroundings of the vehicle. The imager 11 is a camera including a solid-state image pickup element, for example, a CCD and a CMOS, and acquires an image on which image processing can be performed. The imager 11 sets the angle of view of its lens and vertical and horizontal camera angles based on the camera information D03, and outputs an acquired image as image data D08.

The self-position detector 12 detects the self-position of the vehicle based on the landmark information D01. The landmark information D01 indicates, for example, the relative position of a terrestrial landmark (a store, a sight, or a sightseeing spot), detected by a sensor such as an in-vehicle camera or a laser radar, with respect to the vehicle. In the map information D02, positional information on the terrestrial landmark is preregistered. The self-position detector 12 can detect the self-position of the vehicle by checking the landmark information D01 and the relative position information on the terrestrial landmark against each other. Herein, the "position" includes coordinates and an attitude. To be more specific, the position of a terrestrial landmark includes the coordinates and attitude of the terrestrial landmark, and the position of the vehicle includes the coordinates and attitude of the vehicle. As self-position information D05, the self-position detector 12 outputs the coordinates (x, y, z) represented in a reference coordinate system and the attitude components (pitch, yaw, and roll) in the rotational directions of the respective coordinate axes.

For example, the self-position detector 12 detects an initial position of the vehicle using the landmark information D01. The initial position is the position of the vehicle, i.e., the coordinates and attitude thereof, which can be directly obtained from the landmark information D01. Then, the self-position detector 12 adds the amount of movement of the vehicle to the initial position, to thereby calculate the self-position of the vehicle 51. The self-position detector 12 can estimate the amount of movement of the vehicle, i.e., an amount of change in coordinates and attitude, per unit time by using an odometer, a radar, a gyroscopic sensor, a yaw-rate sensor, and a steer-angle sensor.

The traffic signal position estimator 13 estimates the relative position of a traffic signal with respect to the vehicle based on the map information D02 and the self-position information D05. In the map information D02, the positional information (coordinates information) on the traffic signal is preregistered. The traffic signal position estimator 13 can obtain the relative coordinates of the traffic signal with respect to the vehicle from the coordinates of the traffic signal and the coordinates and attitude of the vehicle. The traffic signal position estimator 13 outputs the estimated relative coordinates of the traffic signal as relative position information D06. Note that the traffic signal estimated by the traffic signal position estimator 13 is a traffic signal that presents a signal to the vehicle.

The detection area setter 14 sets a detection area for the traffic signal within an image, based on the relative position of the traffic signal. Because the imager 11 is fixed to the vehicle, a position on the image at which the traffic signal is likely to be captured can be specified within the image when the angle of view and imaging direction of the imager 11 are determined. Based on this position on the image, the detection area setter 14 determines the detection area for the traffic signal within the image.

The traffic signal detector 15, when there are two or more traffic signals, detects a traffic signal having the highest priority level among the two or more traffic signals from the image. Specifically, the traffic signal detector 15 performs image processing for traffic signal detection on the image data D08 within a detection area set for the traffic signal having the highest priority level. The image processing method is not limited. For example, a traffic light in the traffic signal can be detected using synchronous detection processing based on the alternating cycle of commercial power supplies or using hue and shape similarity determination processing. Other known image processing may also be used for traffic signal detection. Performing the image processing not on the entire image data D08, but only on a part thereof (the detection area) reduces the information processing load for the traffic signal detection, allowing quick traffic signal detection. The traffic signal detector 15 outputs a result of the traffic signal detection as the traffic signal information D04.

The self-position detector 12, the traffic signal position estimator 13, the detection area setter 14, and the traffic signal detector 15 can be implemented by a microcontroller having a CPU, a memory, and an input and output unit. Specifically, the CPU executes preinstalled computer programs to implement the multiple information processors (12 to 15) in the microcontroller. Part of the memory in the microcontroller forms map database storing the map information D02. The microcontroller may be used also as an ECU used for other vehicle controls (e.g., autonomous driving control).

Figure 3:
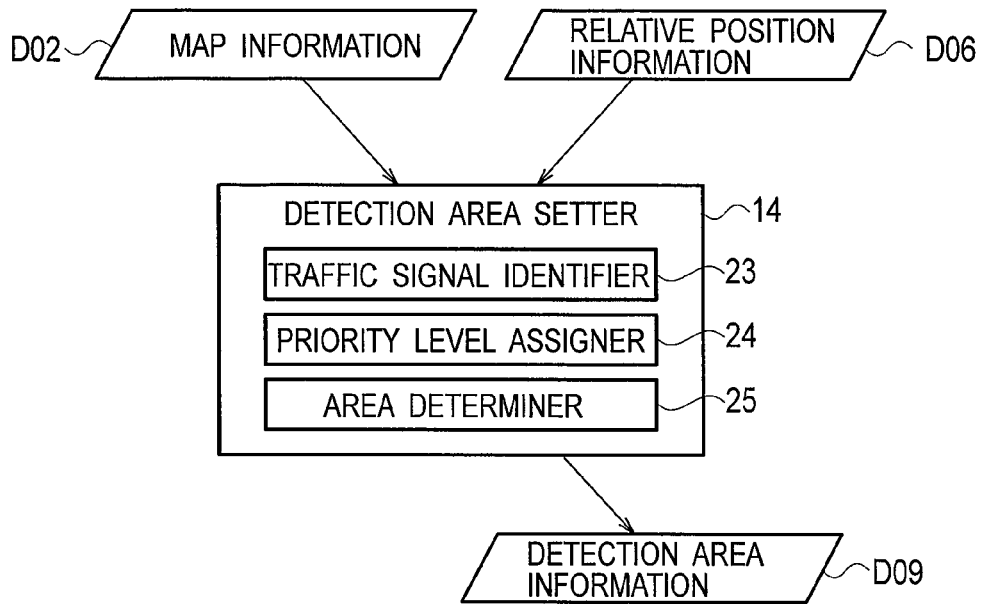
FIG. 3 is a block diagram showing the configuration of a detection area setter 14 in FIG. 2 and a dataflow therein.

With reference to FIG. 3, the configuration of the detection area setter 14 in FIG. 2 and a dataflow therein are described. The detection area setter 14 includes a traffic signal identifier 23, a priority level assigner 24, and an area determiner 25.

The traffic signal identifier 23 identifies two or more traffic signals predicted to be captured in an image, based on the relative coordinates of the traffic signals (relative position information D06). Because the angle of view and vertical and horizontal directions for the image can be specified based on the camera information D03, the traffic signal identifier 23 can identify the traffic signals that fall within the frame of the image. However, the traffic signals identified by the traffic signal identifier 23 include a traffic signal that is within the frame of the image but is not captured in the image because the traffic signal is blocked out of sight due to a factor unknowable from the map information, as will be described later.

The priority level assigner 24 assigns priority levels to the two or more traffic signals contained in the map information D02 and identified by the traffic signal identifier 23, the assignment being based on the possibilities of the traffic signals being blocked out of sight. The traffic signals differ in their likeliness of being captured in an image, i.e., possibility of being blocked out of sight by an obstacle located around the vehicle, depending on the positions of the traffic signals relative to the road and the positions of the traffic signals relative to the vehicle. Details for this will be given later with reference to FIG. 4. For the reason above, when two or more traffic signals are predicted to be captured in an image, the priority level assigner 24 assigns priority levels to the two or more traffic signals.

The area determiner 25 sets a detection area for each of the traffic signals within the image. When the angle of view and imaging direction of the imager 11 are determined, the position of a traffic signal predicted to be captured can be identified on an image based on the relative coordinates of the traffic signal (relative position information D06). The area determiner 25 transforms the relative coordinates of the traffic signal into the coordinates on the image in which the traffic signal has been captured. Specifically, the area determiner 25 receives input of the relative position information D06 and performs, based on the lens optical system in the imager 11, coordinate transformation from the coordinates of the traffic signal in the three-dimensional coordinate system (x, y, z) to the coordinates on the image in the two-dimensional coordinate system (x1, y1). The coordinate transformation method is not limited, and any known method may be used. The area determiner 25 sets a predetermined area containing the transformed coordinates on the image (x1, y1), as a detection area for the traffic signal on the image.

As described, the detection area setter 14 identifies two or more traffic signals that fall within the frame of the image, assigns priority levels to the traffic signals thus identified, and sets a detection area for each of the identified traffic signals.

Figure 4:
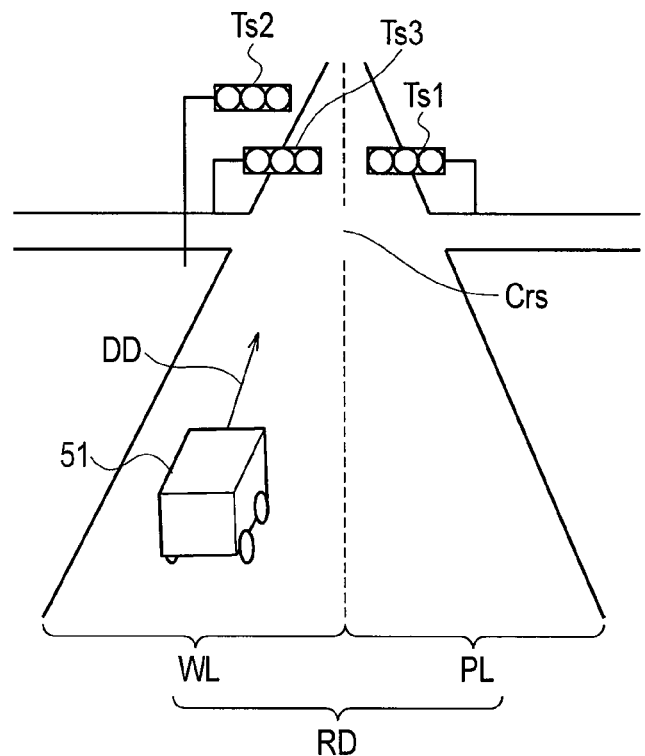
FIG. 4 is a bird's eye view showing an example of priority level assignment by a priority level assigner 24 in FIG. 3.

With reference to FIG. 4, an example of priority level assignment by the priority level assigner 24 is described. In this example, at an intersection Crs, the traffic signal identifier 23 identifies three traffic signals (Ts1, Ts2, Ts3) to be obeyed by the vehicle 51 travelling on a road RD. In this example, the intersection Crs is the first intersection to be crossed by the vehicle 51. Needless to say, the traffic signal identifier 23 may identify traffic signals at the second, third, etc intersections to be crossed by the vehicle 51 after crossing the intersection Crs.

Based on the positional information on the traffic signals contained in the map information D02, the traffic signal identifier 23 identifies that the traffic signal Ts1 is located near the oncoming lane (PL), and the traffic signals Ts2 and Ts3 are located near the current lane (WL). In addition, the traffic signal identifier 23 identifies that the traffic signal Ts2 is located on the near side of the intersection Crs and that the traffic signal Ts3 is located on the far side of the intersection Crs.

The priority level assigner 24 assigns priority levels to the three traffic signals (Ts1, Ts2, Ts3) in conformity with basis rules (R1) and (R2) given below.

(R1) Assign a higher priority level to a traffic signal located near the oncoming lane (PL) than to a traffic signal located near the current lane (WL) of travel of the vehicle 51.

(R2) Assign a higher priority level to a traffic signal close to the vehicle 51 than to a traffic signal distant from the vehicle 51.

The basic rule (R1) is defined based on the following reason. A possibility of being blocked out of sight due to a factor unknowable from the map information, such as a preceding car, a street tree planted on the shoulder of the road, or road work, is higher for a traffic signal located on the current lane (WL) than for a traffic signal located on the oncoming lane (PL). Although an oncoming vehicle might block a traffic signal located on the oncoming lane (PL), the time period of such blocking is only a moment when the oncoming vehicle passes the traffic signal. On the other hand, when a traffic signal located on the current lane (WL) is blocked out of sight due to a factor unknowable from the map information, the time period of such blocking is longer than that for a traffic signal located on the oncoming lane (PL). For example, when the vehicle is following a large-sized vehicle, a traffic signal located on the current lane (WL) is blocked out of sight by the large-sized vehicle for a continuous period of time. For this reason, a higher priority level is assigned to a traffic signal located on the oncoming lane (PL) than to a traffic signal located on the current lane (WL) of travel of the vehicle. This allows preferential detection of a traffic signal which is less likely to be blocked out of sight or is likely to be blocked out of sight only for a short period of time.

The basic rule (R2) is defined based on the following reason. When multiple traffic signals located on the same lane (the current lane WL or the oncoming lane PL) are viewed from the vehicle, a traffic signal close to the vehicle can be recognized more stably than a traffic signal distant from the vehicle because the close traffic signal has a lower possibility of being blocked out of sight and is imaged in a larger size than the far traffic signal.

According to the basic rules (R1) and (R2), the priority levels of the three traffic signals (Ts1, Ts2, Ts3) in FIG. 4 are, from highest to lowest, the traffic signal Ts1, the traffic signal Ts2, and the traffic signal Ts3.

In some cases, the traffic signal identifier 23 identifies an advance warning traffic signal as any of the two or more traffic signals predicted to be captured in the image. Typically, an advance warning traffic signal is provided to give notification of a road condition or traffic-signal condition ahead of time. Thus, even at a position where a regular traffic signal may be blocked out of sight, an advance warning traffic signal is less likely to be blocked out of sight. For this reason, the priority level assigner 24 assigns a higher priority level to an advance warning traffic signal than to other traffic signals. This allows even earlier traffic signal detection.

Although three traffic signals are identified at the intersection Crs in the embodiment, the priority level assigner 24 can of course assign priority levels to two, four, or more traffic signals in conformity with the above rules (R1) and (R2). Additionally, it should be noted that the traffic signals are not limited to ones located at an intersection, but include all traffic signals to be obeyed on a road on which the vehicle is travelling, such as, for example, a traffic signal for a crosswalk on the road RD.

Figure 5:
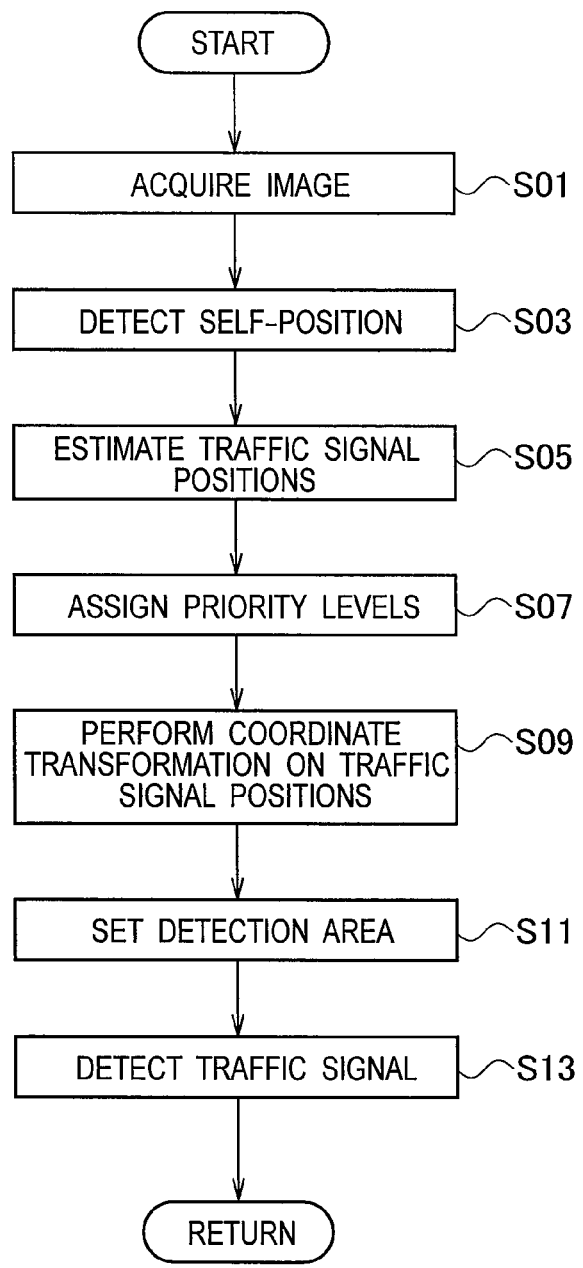
FIG. 5 is a flowchart showing an example of a traffic signal recognition method using the traffic signal recognition apparatus 100.

With reference to FIG. 5, an example of a traffic signal recognition method using the traffic signal recognition apparatus 100 is described. The flowchart shown in FIG. 5 is repeated with a predetermined period.

First, in Step S01, the imager 11 acquires an image by imaging the surroundings of the vehicle 51 based on the camera information D03. In Step S03, the self-position detector 12 detects a self-position of the vehicle 51 using the landmark information D01, and outputs the detected self-position as the self-position information D05.

In Step S05, the traffic signal position estimator 13 estimates the relative positions of traffic signals with respect to the vehicle 51 based on the map information D02 and the self-position information D05.

In Step S07, the traffic signal identifier 23 identifies two or more traffic signals predicted to be captured in the image based on the relative coordinates of the traffic signals (the relative position information D06). Then, the priority level assigner 24 assigns priority levels to the two or more traffic signals identified by the traffic signal identifier 23, based on the possibilities of the traffic signals being blocked out of sight. These possibilities are derivable from the positional information on the traffic signals, which is contained in the map information D02. Specifically, the priority level assigner 24 assigns priority levels to the two or more traffic signals in conformity with the basic rules (R1) and (R2).

In Step S09, the area determiner 25 transforms the relative coordinates (x, y, z) of each traffic signal into coordinates on the image (x1, y1), and determines the center coordinates of a detection area based on the coordinates on the image. The detection area has predetermined size and shape. The detection area is thus determined for each of the two or more traffic signals (Step S11).

In Step S13, the traffic signal detector 15 performs image processing for traffic signal detection on the image data D08 within the detection area, according to the assigned priority levels if there are two or more traffic signals.

Figure 6:
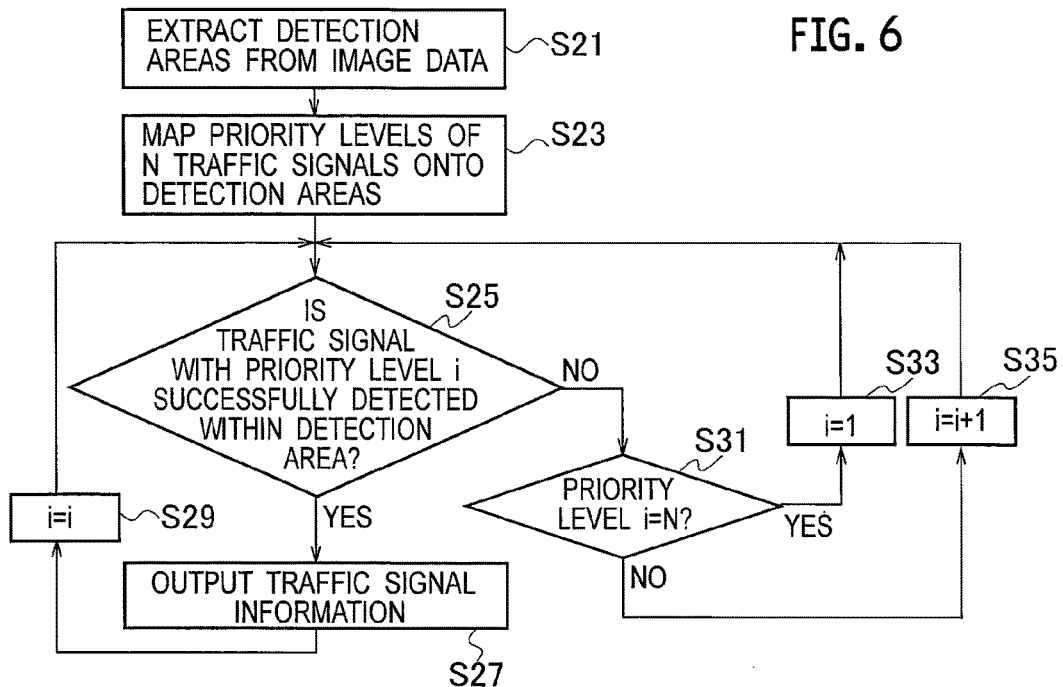
FIG. 6 is a flowchart showing a detailed procedure of Step S13 in FIG. 5 in the first embodiment.

With reference to FIG. 6, a detailed procedure of Step S13 in FIG. 5 is described. The following description assumes that N traffic signals have been identified in Step S07 in FIG. 5. First, in Step S21, image data within the detection areas for the respective N traffic signals are extracted. In Step S23, the priority levels (i) assigned to the traffic signals in Step S07 in FIG. 5 are mapped onto the extracted detection areas. Note that "i" is a natural number from 1 to N, and i=1 at the initial setting.

In Step S25, traffic signal detection is attempted, starting with the detection area corresponding to a traffic signal with the highest (i=1) priority level among the N traffic signals. When the traffic signal is successfully detected (YES in S25), the flowchart proceeds to Step S27 to output the traffic signal information D04. Thereafter, without changing the priority level (Step S29), the flowchart returns to Step S25. This allows the traffic signal to be continuously detected within the same detection area when the traffic signal is successfully detected (YES in S25).

When the traffic signal detection is unsuccessful (NO in S25), on the other hand, the flowchart proceeds to Step S31 to determine whether the current priority level (i) is N, i.e., whether the current priority level (i) is the lowest level. When the current priority level (i) is not N (NO in S31), there is still a detection area for which detection is yet to be attempted. Then, the current priority level (i) is incremented by one (Step S35), i.e., the current priority level is lowered by one, and the flowchart returns to Step S25. When the current priority level (i) is N (YES in S31), on the other hand, it means that detection has been attempted for all the detection areas. Then, after setting the highest priority level as the current priority level (i) again (Step S33), the flowchart returns to Step S25.

The first embodiment described above offers the following advantageous effects.

A traffic signal is, in some cases, hidden and invisible from a vehicle due to a factor unknowable from map information, such as a preceding vehicle, a street tree, or road work. In addition, depending on the positions of the traffic signals relative to the road, traffic signals differ in their likeliness of being captured in an image, i.e., possibility of being blocked out of sight by an obstacle around the vehicle. Considering such circumstances, when it is predicted based on the map information D02 and the self-position information D05 that two or more traffic signals may be captured in an image, the two or more traffic signals are assigned priority levels (i). Then, detection in the image is started with a traffic signal having the highest priority level (i). This increases the probability of detecting a traffic signal when it is predicted that two or more traffic signals may be captured in the image. In addition, early detection of a traffic signal as well as decrease in the computation load can be achieved.

As described in regard to the basic rule (R1), the priority level assigner 24 assigns a higher priority level to a traffic signal located on the oncoming lane (PL) than to a traffic signal located on the current lane (WL) of travel of the vehicle. This allows preferential detection of a traffic signal which is less likely to be blocked out of sight or is likely to be blocked out of sight for a short period of time.

Typically, an advance warning traffic signal is provided to give notification of a road or traffic condition ahead of time. Thus, even at a position where a regular traffic signal may be blocked out of sight, an advance warning traffic signal is less likely to be blocked out of sight. For this reason, when the traffic signal identifier 23 identifies an advance warning traffic signal as any of the two or more traffic signals predicted to be captured in an image, the priority level assigner 24 gives a higher priority level to the advance warning traffic signal than to the other traffic signals. This allows even earlier detection of the traffic signals.

As shown in FIG. 6, after succeeding in detecting a traffic signal with the highest priority level (YES in S25), the traffic signal detector 15 continues to detect the traffic signal. This allows stable, continuous detection of the traffic signal.

It is sometimes faster to detect a traffic signal with the second highest priority level than to wait for detection of a traffic signal with the highest priority level. Thus, as shown in FIG. 6, the traffic signal detector 15 detects a traffic signal with the second highest priority level when unable to detect a traffic signal with the highest priority level (NO in S25). This enables early detection of a traffic signal. In addition, in the flowchart in FIG. 6, the traffic signal detector 15 continues to detect the traffic signal with the second highest priority level. This enables stable, continuous detection of the traffic signal.

(Second Embodiment)

In the flowchart in FIG. 6, as long as a traffic signal with a high priority level is being successfully detected, the traffic signal detector 15 continues to detect that traffic signal and does not detect other traffic signals with low priority levels. In a second embodiment described below, a traffic signal recognition apparatus and a traffic signal recognition method detect, irrespective of whether traffic signal detection is successful, all the two or more traffic signals identified by the traffic signal identifier 23, sequentially from a traffic signal with the highest priority level.

The second embodiment is different from the first embodiment in the procedure of Step S13 in FIG. 5 which is shown in detail in FIG. 6, but is the same as the first embodiment in the configuration of the traffic signal recognition apparatus 100 shown in FIG. 2 and the procedures of Steps S01 to S11 in FIG. 5. Description is omitted for the configuration and procedures which are the same as those of the first embodiment.

Figure 7:
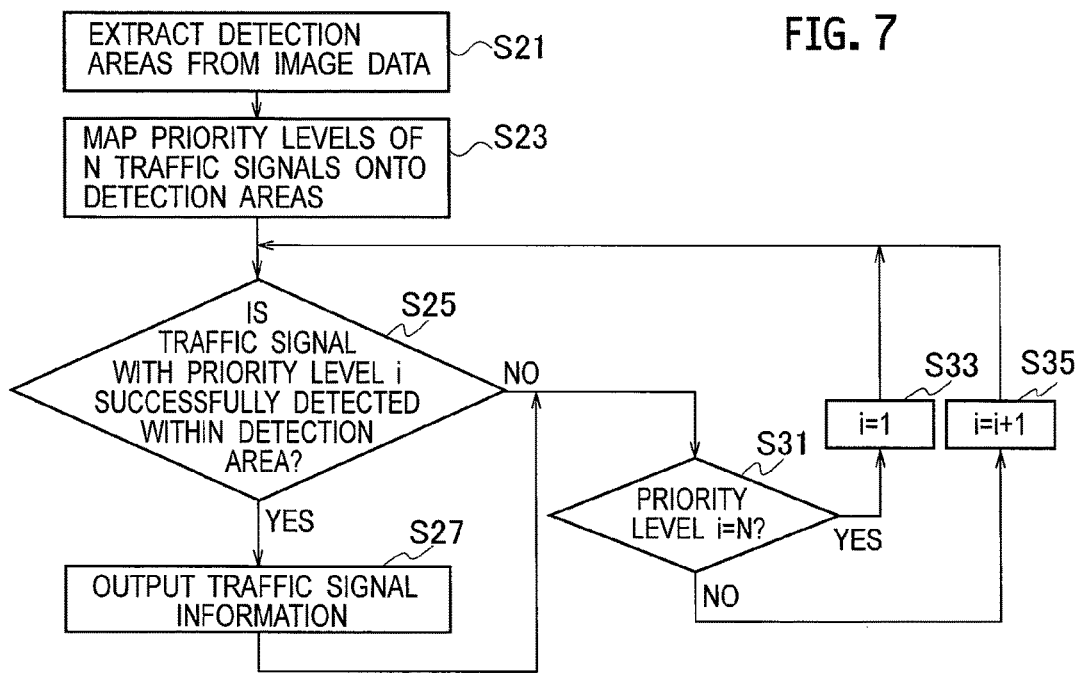
FIG. 7 is a flowchart showing a detailed procedure of Step S13 in FIG. 5 in a second embodiment.

With reference to FIG. 7, a detailed procedure of Step S13 in FIG. 5 is described. First, like in FIG. 6, image data within the detection areas for the respective N traffic signals are extracted in Step S21, and the priority levels (i) assigned to the traffic signals are mapped onto the extracted detection areas in Step S23.

In Step S25, like in FIG. 6, traffic signal detection is attempted, starting with a detection area corresponding to the highest priority level (i=1). When the traffic signal detection is unsuccessful (NO in S25), the flowchart proceeds to Step S31. When the traffic signal detection is successful (YES in S25), the flowchart proceeds to Step S27 to output the traffic signal information D04, and then, unlike in FIG. 6, proceeds to Step S31.

In Step S31, like in FIG. 6, it is determined whether the current priority level (i) is N. When the current priority level (i) is not N (NO in S31), the current priority level (i) is incremented by one (Step S35), and the flowchart returns to Step S25. When the current priority level (i) is N (YES in S31), on the other hand, the highest priority level is set as the current priority level (i) again (Step S33), and the flowchart returns to Step S25.

In this way, when a traffic signal is successfully detected (YES in S25), instead of continuing to detect that traffic signal from the same detection area, detection for the next traffic signal is attempted. In other words, the traffic signal detector 15 detects the two or more traffic signals sequentially from the one with the highest priority level, irrespective of whether the traffic signal detection is successful. Using detection results of all the identified traffic signals for signal recognition enables prevention of erroneous recognition of traffic signals. For this reason, the two or more traffic signals are detected sequentially from the one with the highest priority level, irrespective of whether traffic signal detection is successful. This increases accuracy of traffic signal recognition.

[Third Embodiment]

The possibility of a traffic signal being blocked out of sight is affected by geographic information including the shape of a road on which a vehicle is travelling (such as a straight road, a curved road, or a gradient), the presence of street trees, and the presence of an obstacle such as road work. In a third embodiment described below, a traffic signal recognition apparatus and a traffic signal recognition method take geographic information into account when assigning priority levels.

The third embodiment is different from the first embodiment in the configuration of a priority level assigner 24b and Step S07 in FIG. 5, but is the same as the first embodiment in other configurations of the traffic signal recognition apparatus 100 and other steps in FIG. 5. Description is omitted for the configurations and steps which are the same as those of the first embodiment.

Figure 8:
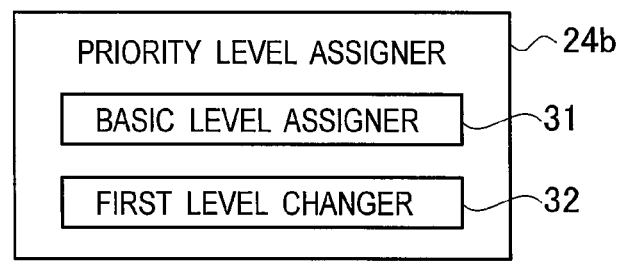
FIG. 8 is a block diagram showing the configuration of a priority level assigner 24b according to a third embodiment.

With reference to FIG. 8, the configuration of the priority level assigner 24b according to the third embodiment is described. The priority level assigner 24b includes a basic level assigner 31 and a first level changer 32. The basic level assigner 31 performs the same arithmetic processing as the priority level assigner 24 in FIG. 3. Specifically, the basic level assigner 31 assigns priority levels to the two or more traffic signals identified by the traffic signal identifier 23, in conformity with the basic rules (R1) and (R2). The priority levels assigned by the basic level assigner 31 are called "basic priority levels".

Figure 9:
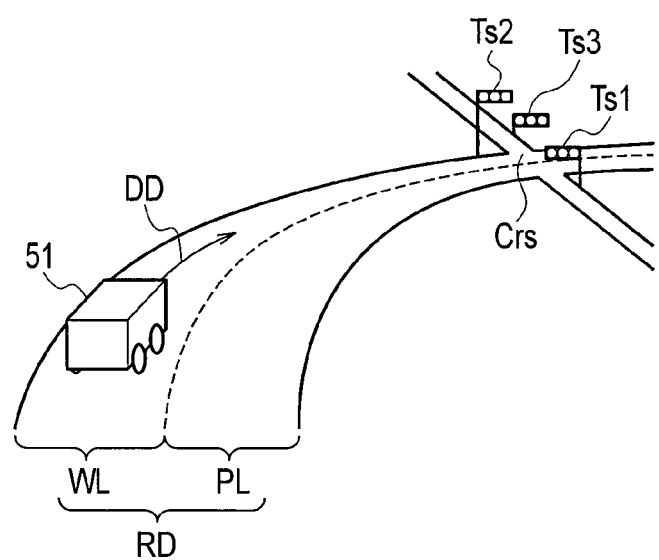
FIG. 9 is a bird's eye view showing an example of priority level assignment by the priority level assigner 24b in FIG. 8.

The first level changer 32 changes the basic priority levels based on geographic information. The changed priority levels are outputted as priority levels assigned by the priority level assigner 24b. To be more specific, as shown in FIG. 9, the first level changer 32 determines the shape of the road RD extending from the current position (self-position) of the vehicle 51 to the intersection Crs at which a traffic signal to be detected is located. For example, the first level changer 32 refers to the map information D02 and determines whether the shape of the road RD on which the vehicle 51 is travelling is a curve curving toward the oncoming lane (PL) from the vehicle 51 in a travelling direction DD.

When determining that the road RD is a curve curving toward the oncoming lane (PL), the first level changer 32 changes the basic priority levels in conformity with an alteration rule (V1) described below.

(V1) Assign a higher priority level to a traffic signal located near the current lane (WL) of travel of the vehicle 51 than to a traffic signal located near the oncoming lane (PL).

Of the current lane (WL) and the oncoming lane (PL), a traffic signal located on the opposite side of the turning direction of the vehicle 51 can be detected from a position farther away from an intersection than a traffic signal located on the same side as the turning direction of the vehicle 51. Accordingly, when the road curves toward the oncoming lane (PL), a traffic signal near the current lane (WL) can be detected earlier than a traffic signal near the oncoming lane (PL). Thus, the alteration rule (V1) is applied to reverse the priority relation in the basic rule (R1).

According to the alteration rule (V1) described above, the priority levels of three traffic signals (Ts1, Ts2, Ts3) in FIG. 9 are, from highest to lowest, the traffic signal Ts2, the traffic signal Ts3, and the traffic signal Ts1. Specifically, the traffic signal Ts2 and the traffic signal Ts3 which are located near the current lane (WL) are assigned higher priority levels than the traffic signal Ts1 located near the oncoming lane (PL). The basic rule (R2) still applies even when the alteration rule (V1) is applied. Thus, the traffic signal Ts2 on the near side of the intersection is assigned a higher priority level than the traffic signal Ts3 located on the far side of the intersection Crs.

The geographic information taken into account by the first level changer 32 may be the shape (gradient) of a road other than the curve, or an obstacle such as a street tree or road work. In such cases, the traffic signal recognition apparatus 100 learns gradient information on the road and obstacle information from travelling data or the like, and adds that information as part of the map information D02. Based on the gradient information and the obstacle information, the first level changer 32 predicts which traffic signal is least likely to be blocked out of sight, and changes the basic priority levels. Although the example in FIG. 9 shows a right curve with the vehicle driving on the left, the third embodiment is of course applicable to a left curve with the vehicle driving on the right.

As described, when the shape of the road RD on which the vehicle 51 is travelling is a curve that curves toward the oncoming lane PL from the vehicle 51's view, the priority level assigner 24b assigns a higher priority level to the traffic signal Ts1 located near the oncoming lane PL than to the traffic signals (Ts2, Ts3) located near the current lane WL. This enables the priority levels to be assigned appropriately in accordance with the road shape.

[Fourth Embodiment]

In a fourth embodiment describe below, a traffic signal recognition apparatus and a traffic signal recognition method attempt to detect traffic signals before priority level assignment, and assign priority levels to the traffic signals that are detected.

The fourth embodiment is different from the first embodiment in the configuration of a priority level assigner 24c and Step S07 in FIG. 5, but is the same as the first embodiment in other configurations of the traffic signal recognition apparatus 100 and other steps in FIG. 5. Description is omitted for the configurations and steps which are the same as that of the first embodiment.

Figure 10:
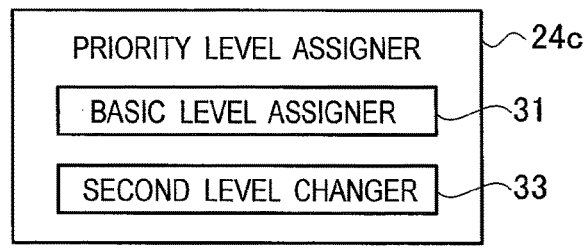
FIG. 10 is a block diagram showing the configuration of a priority level assigner 24c according to a fourth embodiment.

With reference to FIG. 10, the configuration of the priority level assigner 24c according to the fourth embodiment is described. The priority level assigner 24c includes the basic level assigner 31 and a second level changer 33. The basic level assigner 31 performs the same arithmetic processing as the priority level assigner 24 in FIG. 3. Specifically, the basic level assigner 31 assigns basic priority levels to the two or more traffic signals identified by the traffic signal identifier 23, in conformity with the basic rules (R1) and (R2).

The second level changer 33 changes the basic priority levels based on results of traffic signal detection obtained by the traffic signal detector 15. The changed priority levels are outputted as priority levels assigned by the priority level assigner 24c. It is difficult to predict a traffic signal that is blocked out of sight due to a factor unknowable from map information, such as a traffic environment and a road condition, based only on the positional information on the traffic signal. It is desirable that an attempt for detection be made for all the traffic signals identified by the traffic signal identifier 23 and that results of the detection be fed back into the priority levels. Thus, the traffic signal detector 15 makes an attempt for detection for all the traffic signals in advance, and then the second level changer 33 assigns priority levels to the traffic signals that are successfully detected.

Figure 11:
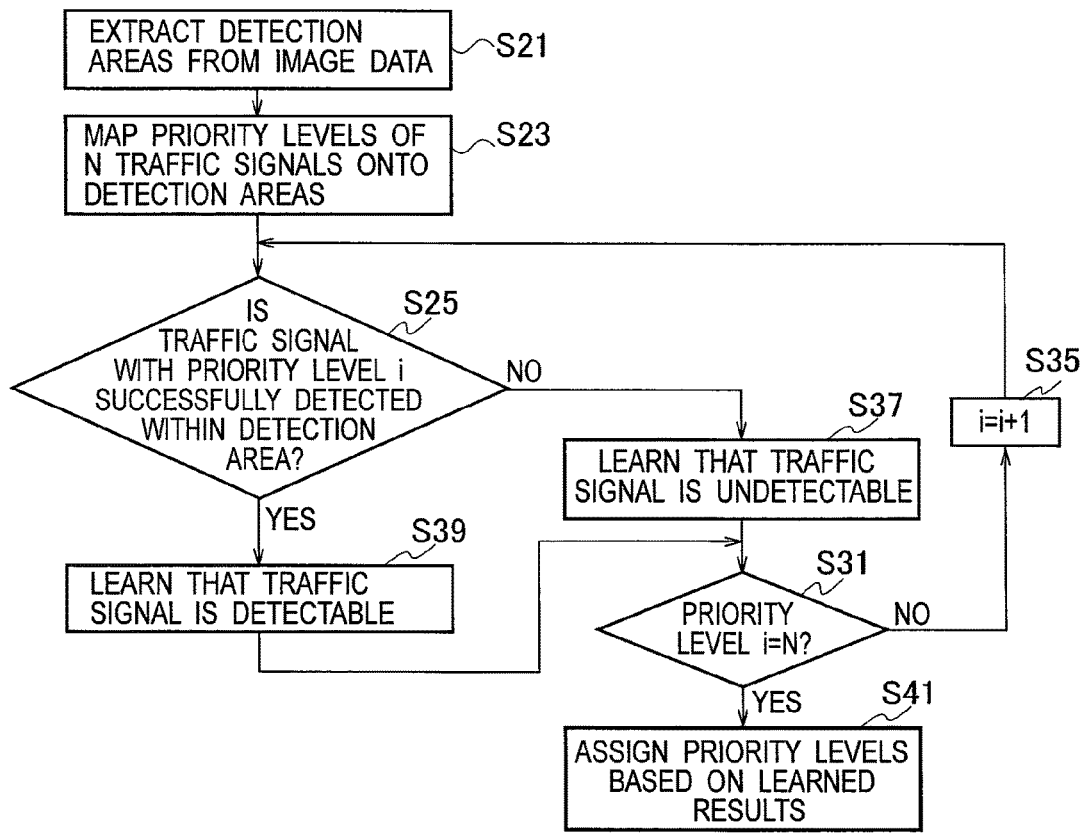
FIG. 11 is a flowchart showing a detailed procedure of Step S07 in FIG. 5 in the fourth embodiment.

With reference to FIG. 11, a detailed procedure in Step S07 in FIG. 5 is described. First, in Step S21, image data within the detection areas for the respective N traffic signals are extracted, and in Step S23, the priority levels (i) assigned to the traffic signals are mapped onto the extracted detection areas.

In Step S25, an attempt is made for traffic signal detection in a detection area that corresponds to a traffic signal with the highest priority level (i=1). When the traffic signal is successfully detected (YES in S25), the flowchart proceeds to Step S39 to give the traffic signal a flag indicative of successful detection. This enables the traffic signal recognition apparatus to learn that this traffic signal is detectable. When the traffic signal is not successfully detected (NO in S25), the flowchart proceeds to Step S37 not to give the successful detection flag. This enables the traffic signal recognition apparatus to learn that this traffic signal is undetectable.

Thereafter, the flowchart proceeds to Step S31 to determine whether the current priority level (i) is N. When the current priority level (i) is not N (NO in S31), the current priority level (i) is incremented by one (Step S35), and the flowchart returns to Step S25. When the current priority level (i) is N (YES in S31), it means that an attempt for detection has been made for all the traffic signals. Thus, the flowchart proceeds to Step S41 to assign priority levels to the flagged traffic signals. This way, priority levels can be reassigned to the detectable traffic signals extracted from the traffic signals assigned basic priority levels by the basic level assigner 31.

Figure 12:
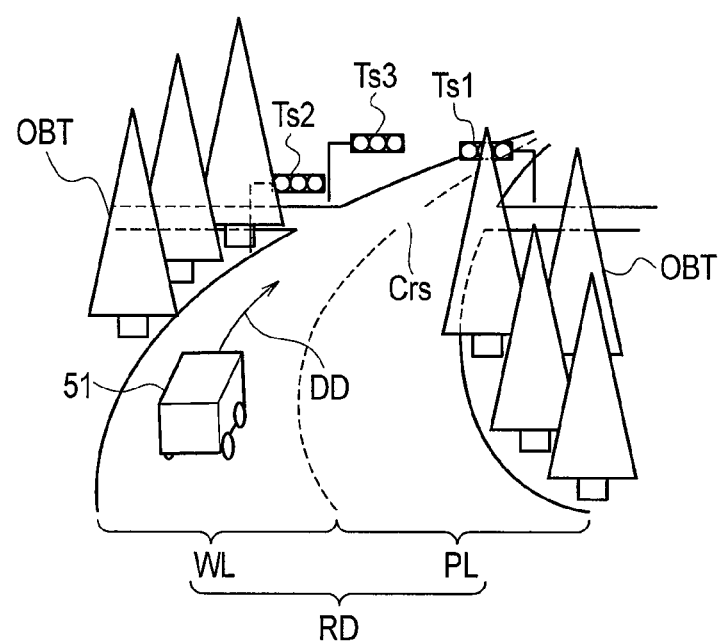
FIG. 12 is a bird's eye view showing an example of priority level assignment by the priority level assigner 24c in FIG. 10.

FIG. 12 shows an example of a road condition where, on the road RD which is a rightward curve, a street tree OBT is blocking a part of the traffic signal Ts1, making the part of the traffic signal Ts1 invisible from the vehicle 51. In this condition, the basic level assigner 31 assigns the basic priority levels to, from highest to lowest, the traffic signal Ts1, the traffic signal Ts2, and the traffic signal Ts3, in conformity with the basic rules (R1) and (R2). Then, the second level changer 33 receives detection results indicating that the traffic signal Ts2 and the traffic signal Ts3 are flagged and the traffic signal Ts1 is not flagged. Based on this detection results, the second level changer 33 assigns priority levels to the traffic signal Ts2 and the traffic signal Ts3, and not to the traffic signal Ts1. As the rules used for the assignment of the priority levels, the second level changer 33 may apply the basic rules (R1) and (R2), or additionally, the alteration rule (V1).

It is difficult to predict a traffic signal that is blocked out of sight due to a factor unknowable from map information, such as a traffic environment and a road condition, based only on the positional information on the traffic signal. It is desirable that an attempt for detection be made for all the traffic signals identified by the traffic signal identifier 23 and that results of the detection be fed back into the priority levels. Thus, the traffic signal detector makes an attempt for detection for all the traffic signals, and the priority level assigner assigns priority levels to the traffic signals that are successfully detected. This allows elimination of undetectable traffic signals from priority-level assignment targets, and therefore allows early detection of detectable traffic signals.

Although the present invention has been described above using the embodiments, the present invention is not limited to what is described hereinabove, and can be modified and improved variously, as is apparent to those skilled in the art.

For example, the first embodiment describes the basic rule for assigning a higher priority level to an advance warning traffic signal than to other traffic signals. This basic rule is applied to the other embodiments, as well. Specifically, the first level changer 32 assigns a higher priority level to an advance warning traffic signal than to other traffic signals, irrespective of whether the advance warning traffic signal is located near the oncoming lane or the current lane. Alternatively, the second level changer 33 assigns a higher priority level to an advance warning traffic signal than to other traffic signals when the advance warning traffic signal is flagged.

REFERENCE SIGNS LIST 11 imager
12 self-position detector
13 traffic signal position estimator
23 traffic signal identifier
24 priority level assigner
15 traffic signal detector
100 traffic signal recognition apparatus
D02 map information
PL oncoming lane
RD road
Ts1, Ts2, Ts3 traffic signal
WL current lane

The invention claimed is:

1. A traffic signal recognition apparatus comprising:
   an imager mounted in a vehicle and configured to acquire an image by imaging surroundings of the vehicle;
   a self-position detector configured to detect a self-position of the vehicle;
   a traffic signal detector configured to detect, in the image, a traffic signal around the vehicle;
   a traffic signal identifier configured to identify two or more of the traffic signal around the vehicle and predicted to be captured in the image, based on the self-position and map information containing positional information on the traffic signals; and
   a priority level assigner configured to assign a priority level to each of the two or more traffic signals identified by the traffic signal identifier, based on a possibility of the traffic signal being blocked out of sight, wherein
   when the traffic signal identifier identifies the two or more traffic signals, the traffic signal detector detects, in the image, a traffic signal with a highest priority level among the two or more traffic signals.

2. The traffic signal recognition apparatus according to claim 1, wherein
   the priority level assigned by the priority level assigner is higher for a traffic signal located near an oncoming lane than for a traffic signal located near a current lane of travel of the vehicle.

3. The traffic signal recognition apparatus according to claim 1, wherein
   when a shape of a road on which the vehicle is travelling is a curve curving toward an oncoming lane from a viewpoint of the vehicle, the priority level assigned by the priority level assigner is higher for a traffic signal located near a current lane of travel of the vehicle than for a traffic signal located near the oncoming lane.

4. The traffic signal recognition apparatus according to claim 1, wherein
   when the traffic signal identifier identifies an advance warning traffic signal as any of the two or more traffic signals predicted to be captured in the image, the priority level assigned by the priority level assigner is higher for the advance warning traffic signal than for a rest of the traffic signals.

5. The traffic signal recognition apparatus according to claim 1, wherein
when successfully detecting the traffic signal with the highest priority level, the traffic signal detector continues to detect the traffic signal.

6. The traffic signal recognition apparatus according to claim 1, wherein
when not successfully detecting the traffic signal with the highest priority level, the traffic signal detector detects a traffic signal with a second highest priority level.

7. The traffic signal recognition apparatus according to claim 1, wherein
the traffic signal detector detects the two or more traffic signals sequentially from the traffic signal with the highest priority level, irrespective of whether the traffic signal is successfully detected or not.

8. The traffic signal recognition apparatus according to claim 1, wherein
the traffic signal detector attempts to detect each of the traffic signals which are identified by the traffic single identifier, before the priority level assigner assigns a priority level,
the priority level assigner assigns the priority level to each of the traffic signals which are identified by the traffic signal identifier and successfully detected, and
the traffic signal detector detects, in the image, the traffic signal with the highest priority level among the two or more traffic signals after the priority level is assigned.

9. A traffic signal recognition method comprising:
acquiring an image by imaging surroundings of a vehicle using an imager mounted in the vehicle;
detecting a self-position of the vehicle;
detecting, in the image, a traffic signal located around the vehicle;
identifying two or more of the traffic signal predicted to be captured in the image, based on the self-position and map information containing positional information on the traffic signals located around the vehicle; and
assigning a priority level to each of the two or more traffic signals thus identified, based on a possibility of the traffic signal being blocked out of sight, wherein
when the two or more traffic signals are identified, the traffic signal detected in the image is a traffic signal with a highest priority level among the two or more traffic signals.

* * * * *